United States Patent [19]

Horne et al.

[11] 4,083,384
[45] Apr. 11, 1978

[54] METHOD AND APPARATUS FOR INJECTING FOAM INTO A PIPELINE, INCLUDING AN INFLATABLE PLUG

[75] Inventors: Frederick F. Horne, Carmel Valley; Gerald G. VanderLans, Lodi, both of Calif.

[73] Assignee: Airrigation Engineering Company, Inc., Carmel Valley, Calif.

[21] Appl. No.: 757,836

[22] Filed: Jan. 10, 1977

Related U.S. Application Data

[62] Division of Ser. No. 664,049, Mar. 4, 1976, Pat. No. 4,025,320.

[51] Int. Cl.² ............................................. F16L 55/12
[52] U.S. Cl. ...................................... 138/93; 134/24; 134/167 C
[58] Field of Search ............... 138/93, 90; 134/167 C, 134/24

[56] References Cited

U.S. PATENT DOCUMENTS

| | | | |
|---|---|---|---|
| 1,506,418 | 8/1924 | Evensta et al. | 138/90 |
| 2,273,984 | 2/1942 | Osborn | 134/167 C |
| 2,976,191 | 3/1961 | Weston | 138/93 X |
| 3,075,535 | 1/1963 | Lasting | 134/167 C |
| 3,870,085 | 3/1975 | Schneider | 138/93 |
| 3,874,926 | 4/1975 | Horne et al. | 134/24 |

FOREIGN PATENT DOCUMENTS

13,611 of 1909 United Kingdom ................. 138/93

*Primary Examiner*—William D. Martin, Jr.
*Attorney, Agent, or Firm*—Owen, Wickersham & Erickson

[57] ABSTRACT

Method and apparatus for injecting foam into a pipeline. Foam is produced and delivered under pressure to the inlet of a flexible foam-conducting tube. An inflatable plug slidably encircles the tube, so that the tube can be adjusted to extend any desired distance beyond the plug. The plug can be enlarged by inflation to bear against the wall of the pipe and also against the wall of the tube, so as to prevent the foam from flowing back beyond the plug.

5 Claims, 9 Drawing Figures

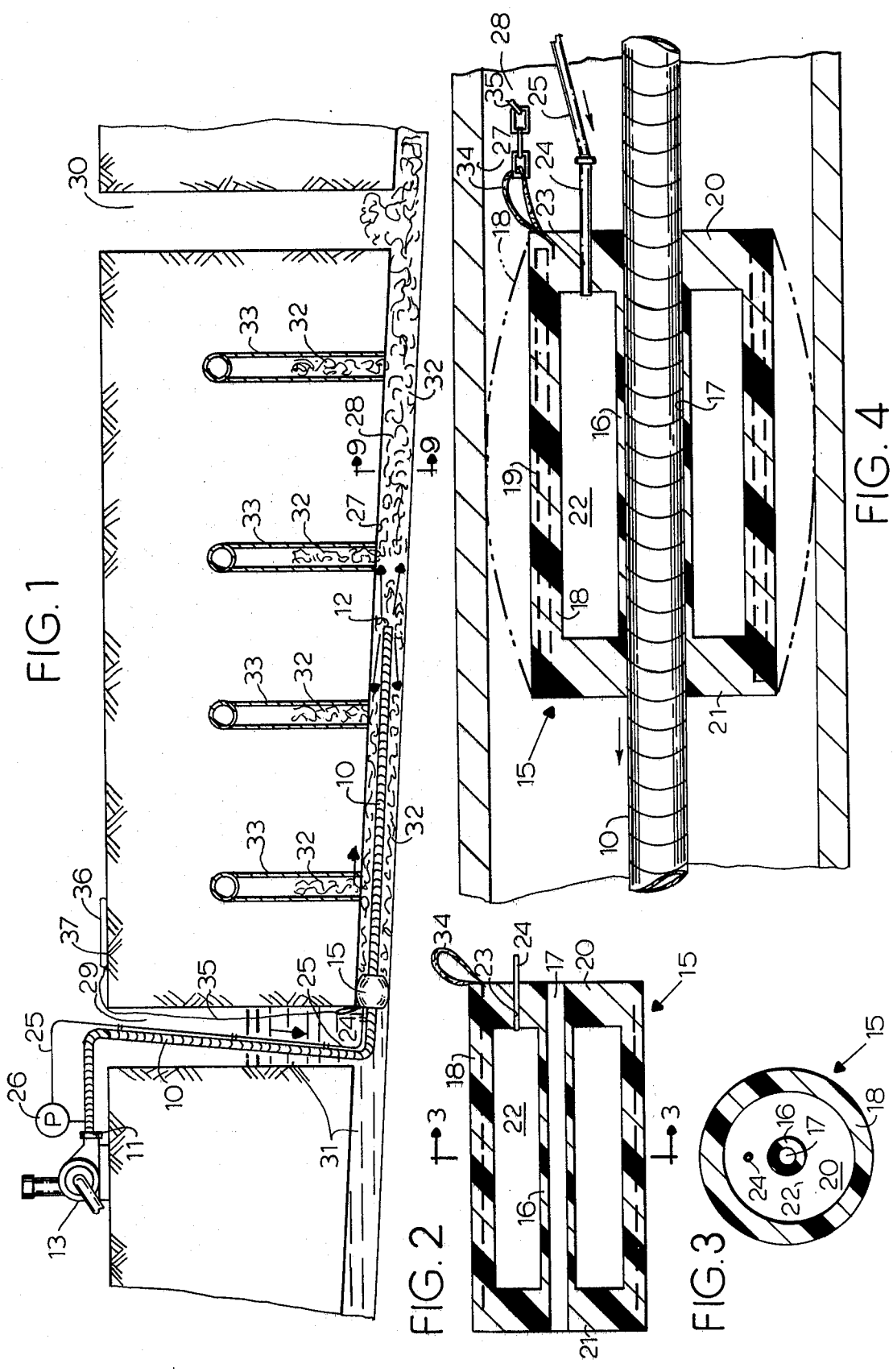

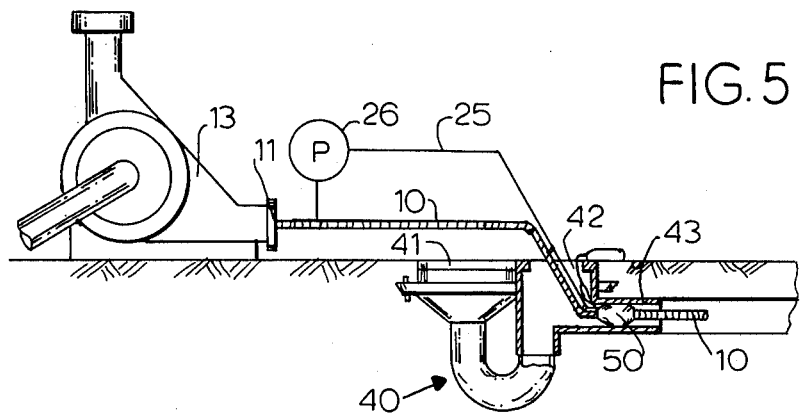
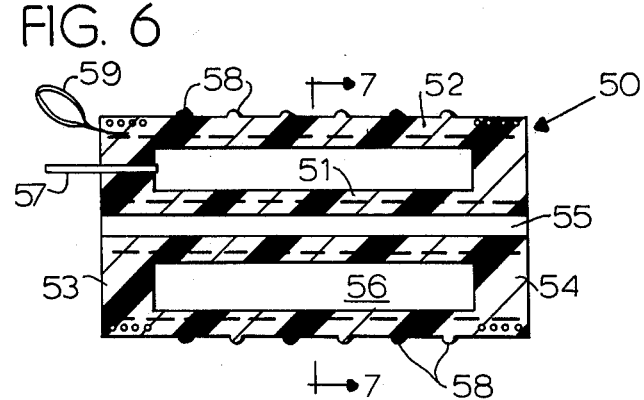
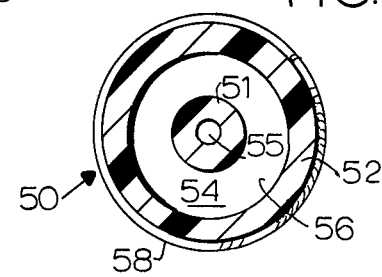
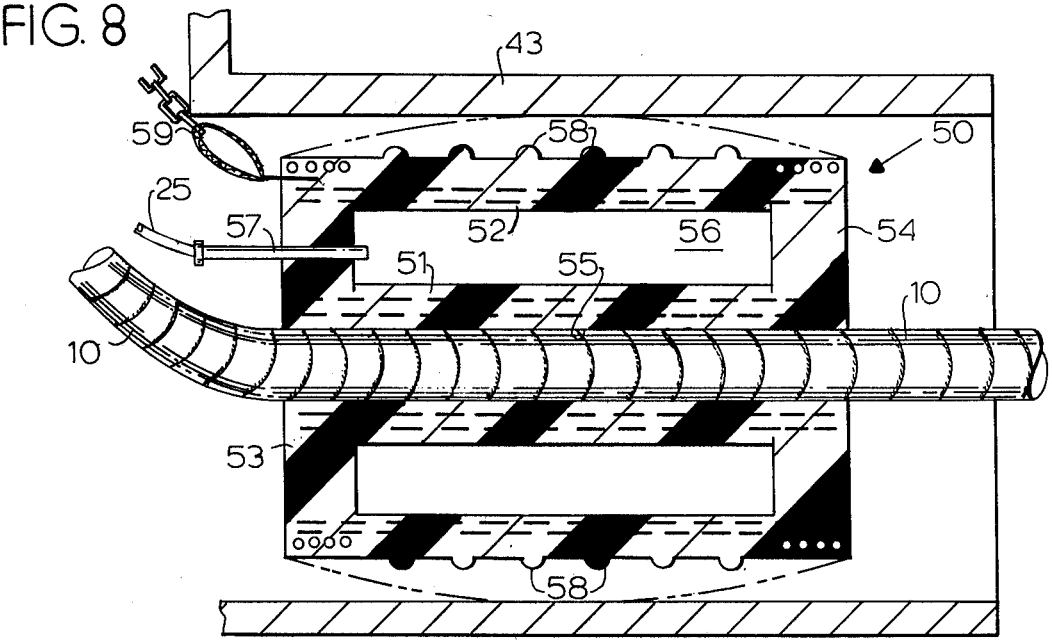

METHOD AND APPARATUS FOR INJECTING FOAM INTO A PIPELINE, INCLUDING AN INFLATABLE PLUG

This is a division of application Ser. No. 664,049, filed Mar. 4, 1976, now U.S. Pat. No. 4,025,320.

BACKGROUND OF THE INVENTION

This invention relates to injecting foam into a pipeline and to a novel plug which forms an important part of the apparatus for doing this.

In order to make clearer what is being done, it may be said that the present invention is used for injecting chemicals that kill root growth in sewers; these chemicals are preferably delivered in the form of foam which clings to the wall of the sewers and to obstructions such as tree roots and grease inside the sewers. The specially prepared foam (described in other U.S. patents) acts to reduce such growth as tree roots and to kill the roots lying within the sewers.

The closest art known to the applicants is that disclosed in their earlier U.S. Pat. No. 3,874,926. In that patent, foam is injected into a pipeline by means of a tube having secured at its end an inflatable plug. While this structure has proved satisfactory in many instances, such as for treating house sewers and building sewers, it also has run into difficulties in other conditions. Thus, when one wanted to treat a long pipeline, such as a sewer in between two manholes, and started injecting foam according to the method and apparatus described in U.S. Pat. No. 3,874,926, back pressure would build up, and the length of sewer pipe or other pipeline that could be treated would be rather short because the building up of this back pressure causes foam to flow back up building service lines and to enter house fixtures. In other words, when the injected foam went out the end of the tube, it would be pushed along the pipe by the pressure of the succeeding foam, but soon the expelled foam would build up a resistance against the newer oncoming foam, and the resistance or back pressure would rise. Soon, the resistance would be such that the pressure of the newly issuing foam would be forced into sewer taps and service lines and to flow back up house sewers into the house fixtures, or into such fixtures in other buildings.

The major purpose of the present invention is to address this problem and to provide a system wherein a longer length of pipeline can be processed in each treatment without requiring large additional pressures.

Another problem of the former invention was that it was substantially limited in use to service lines, such as building sewers. Yet problems very similar to those found in building sewers occur also in the main sewers. The present invention enables practical treatment of main sewers as well as in service lines connecting homes and other individual users to the main sewers. The present invention is also superior in enabling treatment of the lower portions of such branch lines from the main sewers; by controlling the foam pressure in the main sewer, some foam can enter the service sewers and still be kept from entering into the dwellings themselves.

It has also been found that sewer mains often have such heavy root growths that they obstruct movement of the foam and cause the line foam pressure to be excessive. With this invention it becomes possible to extend the foam discharge tube beyond the root obstruction; then, after the pipe above the root growth has been filled with foam, the entire length of the section of pipe to be treated can be filled with foam without using pressures sufficient to force the foam up the building service lines far enough to extrude into the fixtures.

Thus, among the objects of the present invention are: to provide a novel type of inflatable plug and a system related to it in which a longer length of sewer pipe can be treated while other factors remaining substantially the same; to provide a system which can safely be used to treat main sewers; to provide a system having greater flexibility and adaptability than that formerly obtainable; and to provide a plug and system which is better suited to use in service line connections of the individual users to sewers than is otherwise obtainable by the present art.

SUMMARY OF THE INVENTION

The invention incorporates an inflatable plug which has a flexible walled cylindrical through-conduit and a flexible outer wall that surrounds and is spaced from the through-conduit and is joined to it by a pair of end walls which define a chamber between the through-conduit and the outer wall. One of the end walls has air inlet means leading in to the chamber. The plug is made to be normally slidable relative to pipes with which it is to be used, so that it can be freely inserted into the pipe, whether it be a sewer or a service line, or whatever, and located in a desired spot; then the plug can be inflated to seal the passage off between the through-conduit and the wall of the pipe or sewer. In this respect, it is generally like the prior art shown in U.S. Pat. No. 3,874,926. However, it differs from that in that the tube which is to be used to conduct the foam is made so that it is normally slidable relative to the through-conduit. The tube can thus be inserted into the conduit and pushed as far beyond the plug as may be desired, extending to any desired location, and then when the plug is inflated at its desired location to engage the outer wall snugly, the plug also engages the tube snugly, preventing back flow. However, by proper adjustment of the air pressure in the chamber, it becomes possible to move the tube relatively to the plug while continuing to send foam through the tube.

With the aid of this plug it becomes possible for the flexible tube through which the foam is sent to extend for any desired distance beyond the plug. For example, when it is desired to treat a length of pipe extending between two points, the outlet of the flexible tube can be located at approximately midway between those two points, with the plug located near one of the points; then the expelled foam will go first in the direction beyond the tube and, as pressure tends to build up there, tends to flow back along and around the tube; then the foam will move in each direction alternately at pressures sufficient to force the foam the full length of the sewer section being treated, without creating enough pressure to force the foam up into house fixtures. Those familiar with the art and this device can adjust the tube outlet position to control the foam pressure as needed, even doing so while the treatment is going on and while foam is being injected, if desired. In effect, this means treating a length of pipe much larger and longer than would be practical with the device of U.S. Pat. No. 3,874,926.

The method involves producing the foam and delivering it under pressure to the inlet of the flexible foam-conducting tube and sending it through that tube to its outlet while blocking off the pipeline which is to be treated at a point lying back along the tube at a considerable distance from the outlet. This distance can be easily adjusted.

The method may also include adjusting the air pressure in the chamber so that the plug can be held in position in the sewer pipe while pulling the tube through the plug. In some instances this is done while foam is being injected.

The invention also is applicable to treating service lines by insertion in a P-trap or similar cleanup of a home line, with the plug ultimately being inflated adjacent the P-trap to prevent backflow and the flexible tube set as far down the individual service line as may be desired, to expel the foam there for ultimate flow in both directions but without any flow coming back through the P-trap.

Other objects and advantages of the invention will appear from the following description of some preferred forms.

BRIEF DESCRIPTION OF THE DRAWINGS

In the drawings:

FIG. 1 is a somewhat diagrammatic view in elevation and in section showing an installation embodying the principles of the invention for treating a sewer main in between two manholes. The apparatus is shown in use, the plug blocking the flow of water from above, so that water builds up there, while foam is forced in below and fills the pipe as well as entering a controlled distance up the branch or service lines.

FIG. 2 is an enlarged view in elevation and in section of a plug of the present invention, as shown in FIG. 1.

FIG. 3 is a view in section taken along the line 3-3 in FIG. 2.

FIG. 4 is a somewhat further enlarged view of a portion of the installation of FIG. 1, with the flexible tube going in the opposite direction from that shown in FIG. 1. In broken lines, the expanded position of the plug is shown.

FIG. 5 is a somewhat diagrammatic view of an apparatus embodying the principles of the invention installed in the clean-out of a shower drain with a P-trap, for cleaning out a service line at an individual user's cleanout.

FIG. 6 is a view similar to FIG. 2 in elevation and section of a modified form of plug embodying the principles of the invention.

FIG. 7 is a view in section taken along the line 7—7 in FIG. 6.

FIG. 8 is a further enlarged view of a portion of the installation of FIG. 5, employing the plug of FIG. 6.

FIG. 9 is an enlarged view in section taken along the line 9—9 in FIG. 1.

DESCRIPTION OF SOME PREFERRED EMBODIMENTS

The device and Installation of FIGS. 1 through 4

In all forms of the invention a flexible tube 10 is employed which is of suitable strength and sufficient rigidity so that it remains erected rather than collapsing, but is also flexible enough to bend around corners to enable its use in pipelines of various types. The size of the tube 10 depends generally upon the amount of foam that it is to conduct. It may comprise a plastic or synthetic rubber pipe of the type which is resistant to the chemicals employed. It may have some reinforcement or strengthening around its circumference to maintain its rigidity, if that be desired.

The tube 10 has an inlet 11 and an outlet 12. The inlet 11 of the tube 10 is connected to a foam generating member 13, which may be a suitable type of pump in which air and liquid are introduced. The generator 13 whips large quantities of air into the liquid to generate foam. A Waukesha pump made by the Waukesha Foundry Company, Inc., may be used, and such a typical pump has a screened air inlet and an inlet hose and strainer. As an outlet, a suitable hose type of tubing may be provided, typically from $\frac{3}{4}$ inch to $1\frac{1}{2}$ inch in diameter and preferably transparent to enable monitoring the foam discharge. A $\frac{1}{2}$ horsepower motor may be used to achieve the speed of about 725 rpm, or an 8-horsepower gasoline engine may enable about 2000 rpm. Intermediate horsepowers and speeds may be used. Such a device is efficient in generating and sending out foam in quantity. It does so rapidly so that sewer laterals and septic system lines of normal length can be filled within a few minutes. The typical foam output may be in the range of about 10 to 80 gallons per minute from about a half-gallon to about 4 gallons per minute of the liquid mixture. The mixture itself is preferably 5% of suitable foam-making root treatment herbicide chemical, containing a surfactant which helps to retain the foam structure and to remove grease and slime from roots, and the remaining 95% is water. Such a foam and its active ingredients, once injected into a pipeline, remain clinging to the roots and other internal pipe surfaces for some time even after normal waterflow has been resumed, thereby treating the roots for an extended period and removing grease and other soil, to enhance absorption. The clinging effect prolongs the treatment assuring effective uptake by the roots of the toxic quality of the chemical to assure complete kill and extended regrowth control.

The tube 10 is used in conjunction with a plug 15 embodying the principles of the invention. The plug 15 comprises an inner wall 16 which surrounds and defines a cylindrical through-circuit 17. The tube 10 is inserted into and through this conduit 17 and is slidable with respect to the wall 16, though not so freely that a chosen position cannot be held well enough for enabling the apparatus to be put in place. Yet it is sufficiently slidable that the amount of the tube 10 which extends beyond the plug 15 may be varied as desired until the plug 15 is actually inflated. Even then, the plug 15 may be kept inflated at a pressure which holds it in place and yet enables one to slide the tube 10 relative to the plug 15.

The plug 15 also includes an outer wall 18 which may be reinforced by fabric 19 which preferably comprises a series of lengthwise extending threads, disposed around the circumference so that outward expansion can take place freely and yet there is reinforcement.

The wall 18 is joined to the wall 16 by stiff, annular end walls 20 and 21, and the four walls 16, 18, 20, and 21 define an annular chamber 22. The annular chamber 22 is completely enclosed except for a small opening 23 which leads through the wall 20. In this air conduit 23 is secured an air-conducting tube 24 which extends outside the tube 10. During use, the air tube 24 is connected by an elongated air conduit 25 to a suitable air compressor 26, which generates air under pressure and sends it down through the conduits 25 and 24 into the chamber 22. When air pressure is applied in sufficient amount, the wall 18 is expanded, as shown in FIG. 1 and in broken lines in FIG. 4, into contact with an outer surrounding surface such as a wall 27 of a sewer 28. The plug 15 thus blocks off that portion of the sewer 28 and prevents passage of foam around the plug 15. At the same time, the inflation causes the inner wall 16 to hug the tube 10 very tightly and to prevent the passage of any foam back between the tube 10 and the wall 16, and also prevents relative movement of the plug 15 and tube 10.

Thus, in operation the tube 10 may be pulled through the plug 15 to any length desired, and the combination of the plug 15 and the tube 10 inserted down a manhole 29 into the sewer pipe 28. The plug 15 is usually located closely adjacent to the manhole 29, while the outlet 12 of the tube 10 lies at a suitable location, which may typically be about halfway between the manhole 29 and a succeeding manhole 30. If the distance between the manholes 29 and 30 is very great, the outlet 12 may be located only a quarter of the way, and then the tube 10 is later withdrawn from the manhole 29 and reinserted in the manhole 30 for treatment of the other held of the sewer portion lying between these two manholes 29 and 30.

When the plug 15 is in place, air is applied from the compressor 26 through the conduits 25 and 24 into the chamber 22 to inflate the plug 15 and cause snug engagement by the wall 18 with the pipe wall 27 and snug engagement of the wall 16 with the tubing 10. The sewage liquid 31 is thereby backed up in the sewer pipe 28 above the plug 15, partially filling the manhole 29.

While this pressure is maintained, foam is fed from the foam generator 13 to the pipe 10 and goes through the tube 10 and out the outlet 12 as foam 32. At the outlet 12 the foam tends to flow first toward the manhole 30 until pressure builds up sufficiently to cause backflow, and then tends for awhile to flow back toward the plug 15. The flow tends to fluctuate as pressures build up until finally a practical pressure level is reached in which the tube is filled with foam 32 and also some foam 32 enters service lines 33 and the manhole 30. Entry into the service lines 33 is controlled by controlling the injection pressure, and foam 32 is not permitted to flow back up into the house and house fixtures.

After this treatment the tube 10 may be withdrawn by deflating the plug 15 and pulling everything out through the manhole 29. As stated before, the foam will cling inside and withdrawal therefore does not mean the end of treatment. To enable easier withdrawal, the plug 15 may have a wire loop 34 with an anchor molded into the end wall 20, and a chain or cable 35 may be attached to the loop 34 during use. The cable or chain 35 may extend up to the top of the manhole 29 and held in place near there by a manhole cover 36 resting on top of its end 37. When the plug 15 is deflated, the chain or cable 35 and the loop 34 may be removed easier.

Also, the loop 34 and cable or chain 35 may be used in a special treatment to help hold the plug 15 in place while moving the tube 10, the air pressure in the chamber 22 being adjusted for this purpose.

The embodiment of FIGS. 5 through 8

FIG. 5 shows a rather typical treatment of a service line employing apparatus embodying the principles of the present invention. In this case the plug is typically much smaller. FIG. 5 shows a P-trap 40 having a normal inlet 41 and also having a cleanout 42 which is normally covered by a cap or plate, not here shown. The P-trap 40 leads to a service line 43, which ultimately joins a service main. For use of this invention the plate is removed, and the plug and tubing are inserted into the cleanout 42.

Here, a plug 50 is used in conjunction with the tube 10. The connection of the tube 10 to a suitable foam generator 13 is the same as before, and the same type of air compressor 26 and air conduit 25 can also be used. A plug 50 having exactly the same form as that of the plug 15 may be used, and by way of illustration again a different form of plug is shown. Here, the plug 50 has an inner cylindrical wall 51, an outer cylindrical wall 52 and annular end walls 53 and 54. The inner cylindrical wall 51 is shown somewhat thicker than the wall 16, and is shown to be somewhat reinforced, but again it defines a through-conduit 55 through which the tube 10 may be slid into a desired position. The length of tube extending beyond the plug 50 into the service line 43 may be regulated as desired. A chamber 56 is enclosed by the walls of the plug 50, and one end wall 53 is provided with a conduit 57 for leading air into the chamber 56.

The reinforcement is preferably done by a series of circular threads so that expansion outwardly is feasible. In the present plug 50, a series of circular ribs 58 is also provided around the outer circumference of the wall 52, to enable even better engagement with the pipe 43. Also, a loop 59 is secured to the end wall 53 and the outer wall 52; rope may be passed through the loop 59 to help in locating or removing the plug 50.

The operation of the system of FIGS. 5-8 is substantially that already described, the tube 10 being adjusted to the plug 50 to give the desired amount of extension beyond the plug 50 and the assembly then inserted into the pipe 43 so that the plug 50 can be locked into the pipe 43 at some point, preferably closely adjacent to the cleanout 42. Then the plug 50 is inflated, and its wall 52 engages the wall of the pipe 43, while its wall 51 snugly engages the wall of the tube 10. Foam is then generated and sent down into the tube 10 and into the pipe 43 to treat it as before. Upon completion the plug 50 is deflated and the assembly withdrawn.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A unitary molded rubber plug for use in injecting foam into a pipe via a foam-conducting flexible tube, comprising:
   a flexible-walled, constant-diameter, smooth-surfaced, imperforate through-conduit for passage of said tube therethrough,
   a flexible imperforate cylindrical outer wall surrounding and spaced from said through-conduit by a chamber, and
   a pair of stiff, thick annular end walls integral with said outer wall and with said through-conduit and thicker and stiffer than said outer wall and through-conduit, so that no additional members are required to retain them against expansion when said plug is inflated for use, said end walls defining the ends of said chamber and joining said outer wall to said through-conduit, one said end wall having air inlet means for said chamber,
   said plug being normally slidable relative to a said tube when said plug is inflated sufficiently to engage immovably against a said pipe, so that said tube can extend through and beyond said plug to a desired location and can be moved relatively to said plug, said through-conduit holding a said tube snugly when said plug is further inflated, said outer wall then engaging and sealing against said pipe.

2. The plug of claim 1 having a series of circular reinforcing filaments embedded in said outer wall.

3. The plug of claim 1 having a series of circular outer ribs on said outer wall.

4. The plug of claim 1 having an anchor loop molded into the end wall having said air inlet means.

5. The plug of claim 1 having a series of lengthwise extending filaments disposed circularly about and embedded in said outer wall.

* * * * *